United States Patent Office 3,163,510
Patented Dec. 29, 1964

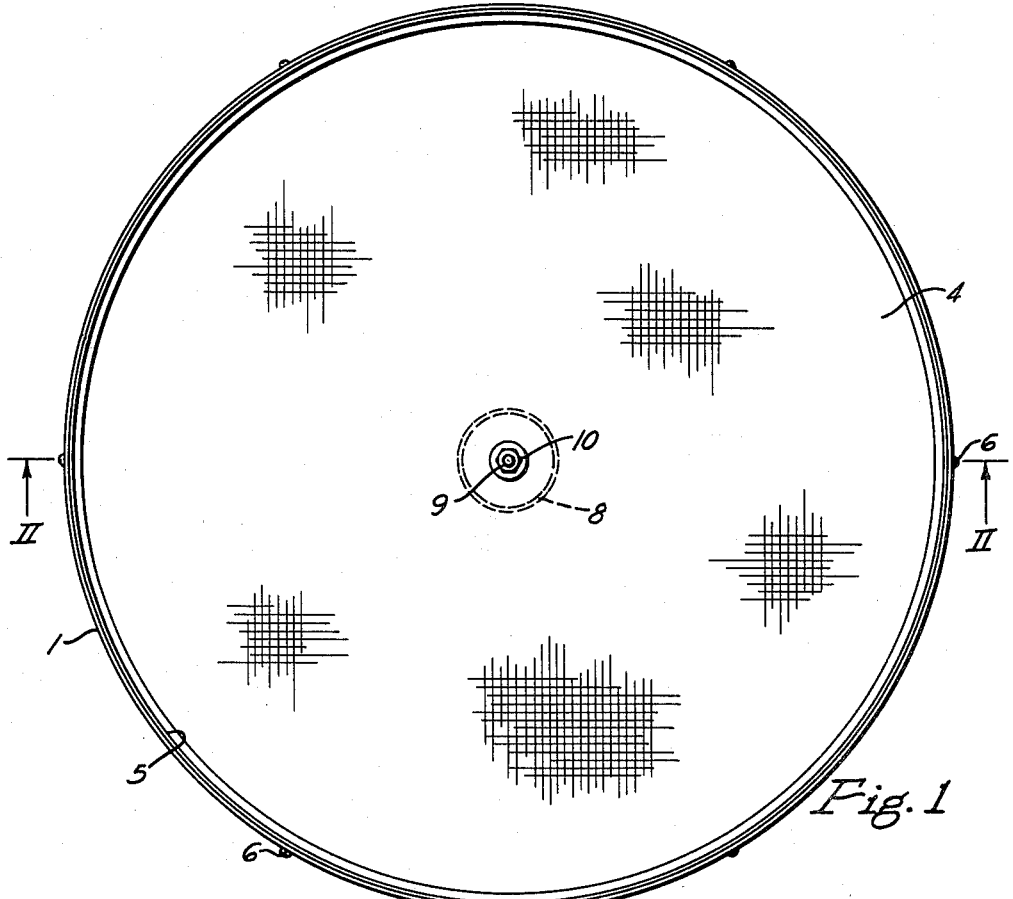
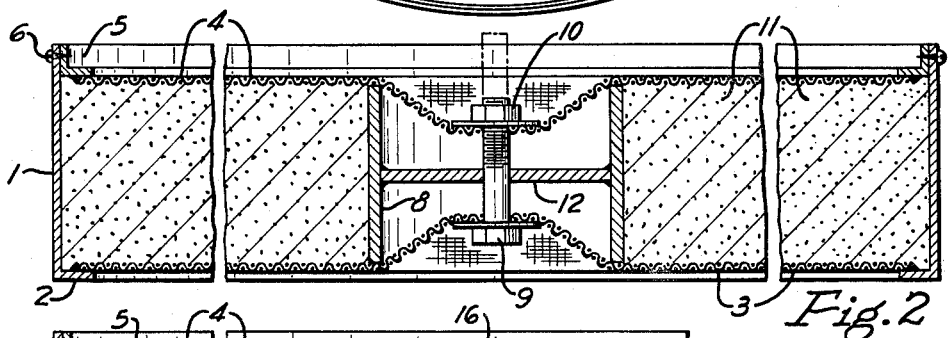
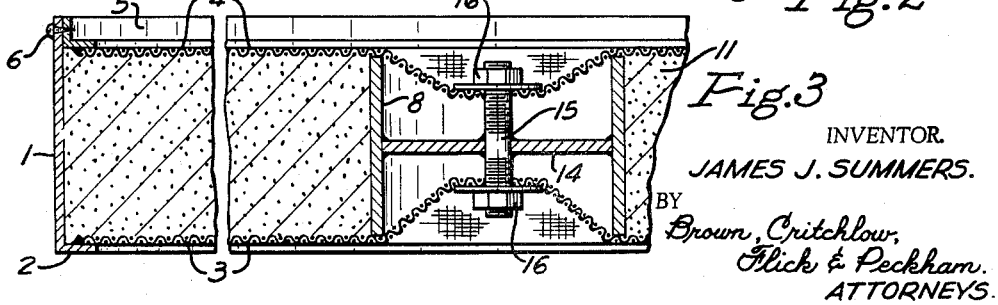

3,163,510
THIN FILTER FOR FLUIDS
James J. Summers, Bethel Park, Pa., assignor to Mine Safety Appliances Company, Pittsburgh, Pa., a corporation of Pennsylvania
Filed Oct. 1, 1962, Ser. No. 227,459
5 Claims. (Cl. 55—519)

This invention relates to filters, whether for removing particulate matter or noxious gases from a fluid, and more particularly to filters that are thin in relation to their width.

When a large filter has a thin filter bed, particularly if that bed is composed of particulate material, special precautions must be taken to insure that the bed will have a uniform thickness to prevent channeling, because the large area of the perforated members confining the bed allows them to flex and permit some portions of the bed to be thicker than others. In a thin bed, that is highly undesirable. The usual way of maintaining a uniform bed is to include enough additional structural members in the filter to hold the perforated members flat and parallel. However, such a solution adds to the complexity of manufacturing the filter, and the reinforcing or stiffening members block much of the filtering area.

It is among the objects of this invention to provide a large thin-bed filter, in which the bed-confining perforated members are held flat and rigid in a simple and inexpensive manner that does not block the filtering area to an appreciable extent.

In accordance with this invention, a short tubular shell has open ends, across which extend a pair of axially spaced flexible screens, by which is meant perforated solid plates or sheets as well as woven screens. The edges of the screens are rigidly connected to the shell. Disposed between the central portions of the screens is a rigid cylindrical tubular spacer, the ends of which engage the screens. Extending through the centers of the spacer and screens are means for drawing the central portions of the screens into the spacer sufficiently to stretch flat the areas of the screens between the spacer and shell and maintain those areas rigid. The space between the flat areas of the screens is filled with the desired filtering material. Since the areas of the screens engaging the material can be held flat and parallel, the filter bed will have a uniform thickness and channeling will be minimized.

The invention is illustrated in the accompanying drawings, in which

FIG. 1 is a plan view of my filter;
FIG. 2 is an enlarged cross section taken on the line II—II of FIG. 1; and
FIG. 3 is a fragmentary cross section, similar to FIG. 2, of a modification of the invention.

Referring to FIGS. 1 and 2 of the drawings, a short tubular shell 1 formed of any suitable material, such as sheet metal, preferably is cylindrical. The diameter of the shell is many times greater than its length. The shell has an inturned flange 2 at one end. Secured to this flange, such as by welding, is the edge of a flexible screen 3, such as a perforated metal plate or a wire screen, that extends across the shell. The edge of a similar screen 4 is secured to a ring 5 of angular cross section, which may be mounted in the opposite end of the shell parallel to flange 2 by means of radial screws 6. The two screens are spaced apart a distance equal to the thickness that the thin filter bed is to have.

It is a feature of this invention that means are provided for tensioning the two screens so that the major portions of their areas will be maintained flat and rigid. Accordingly, a cylindrical tubular spacer 8, which is short and rigid and of very small diameter in comparison with the size of the shell, is disposed between the central areas of the screens and is coaxial with them. Extending through the center of the spacer and the centers of the adjoining screens is a tensioning member, such as a bolt 9. Screwed on one end of the bolt is a nut 10. Washers may be mounted on the bolt against the outer faces of the screens. When the nut is tightened on the bolt, the central portions of the two screens will be drawn toward each other inside the spacer, and that will stretch the surrounding areas of the screens extending between the spacer and shell to pull them flat. Since the flat areas will be under constant tension, they will be held rigid, and by making the length of the spacer the same as the distance between the outer edges of the screen, the flat areas of the screens will be maintained parallel. After the nut has been screwed onto the bolt as far as necessary, the projecting threaded end of the bolt, shown in dotted lines in FIG. 2, can be cut off.

The space between the screens around the spacer 8 is filled with the desired filtering material 11, usually granular. With the portions of the screens that engage the filter bed parallel and rigid, the thickness of the bed is uniform throughout its area to reduce or prevent channeling. Fluid is prevented from flowing through the spacer and bypassing the filter bed either by packing the spacer with impermeable material or by securing a circular plate 12 inside of it. Such a plate has a central hole in which bolt 9 fits snugly or is sealed.

In the modification shown in FIG. 3, the inside of the cylindrical spacer is provided with a central circular plate 14, in which the central portion of a stud 15 is welded. The opposite ends of the stud extend through the centers of the two screens and receive nuts 16 that force the central portions of the screens toward each other to stretch and stiffen the screens. In this form of the invention, either screen can be stressed independently of the other because the stud cannot move axially in the spacer. The protruding ends of the studs can be cut off after the nuts have been tightened.

It will be seen that the screens are held rigid without the use of any stiffening members except the small assembly at the center of the filter. The area of that assembly is so small in relation to the screen area, that the blocked area of the screens is negligible. Furthermore, the screens can be tightened as needed.

The filtering material generally is poured into the shell before the upper screen is applied, but if desired, it could be introduced through an opening in the side of the shell after both screens are in place. In such a case, the opening obviously would have to be plugged or covered to hold the filtering material in place.

According to the provisions of the patent statues, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A fluid filter comprising a short tubular shell open at its opposite ends, a pair of axially spaced screens extending across the shell and rigidly connected at their edges thereto, a rigid cylindrical tubular spacer disposed between the central portions of the screens with its ends engaging their inner surfaces, tensioning means having a diameter smaller than the spacer and engaging said central portions, said means extending through the center of the spacer and drawing the central portions of the screens into the spacer to stretch flat and stiffen the surrounding areas of the screens between the spacer and shell, and filtering material filling the space between the flat areas of the screens.

2. A fluid filter according to claim 1, in which said means include a bolt and nut.

3. A fluid filter according to claim 1, including means in said spacer preventing fluid flow therethrough.

4. A fluid filter comprising a short tubular shell open at its opposite ends, a pair of axially spaced screens extending across the shell and rigidly connected at their edges thereto, a rigid cylindrical tubular spacer disposed between the central portions of the screens with its ends engaging their inner surfaces, a cross member extending across the central portion of the spacer and secured thereto, a stud projecting rigidly from both sides of the center of said cross member and extending through the centers of the screens, nuts screwed on the ends of the stud and forcing the central portions of the screens into the spacer to stretch flat and stiffen the surrounding areas of the screens between the spacer and shell, and filtering material filling the space between the flat areas of the screens.

5. A fluid filter according to claim 4, in which said cross member is a circular plate secured at its edge to said spacer.

References Cited in the file of this patent

UNITED STATES PATENTS

| | | |
|---|---|---|
| 1,944,279 | Skelton | Jan. 23, 1934 |
| 2,329,248 | Carlson | Sept. 14, 1943 |
| 2,412,841 | Spangler | Dec. 17, 1946 |
| 2,764,251 | Jessop | Sept. 25, 1956 |
| 3,048,960 | Ohlson | Aug. 14, 1962 |